Patented Mar. 2, 1954

2,671,083

UNITED STATES PATENT OFFICE 2,671,083

PREPARATION OF CRYSTALLINE SALTS OF PENICILLIN

Harold Tozer, Neston, and Neville Mackinnon Cross and Ronald Goodey, Bebington, England, assignors to The Distillers Company Limited, Edinburgh, Scotland, a British company No Drawing. Application September 19, 1952, Serial No. 310,542

Claims priority, application Great Britain July 14, 1948

12 Claims. (Cl. 260—239.1)

This invention relates to an improved process for the production of crystalline sodium penicillin and potassium penicillin.

The method of recovery of penicillin from fermentation broth followed for a considerable time comprised the extraction of the filtered acidified broth into an organic solvent—usually amyl acetate—the carbon treatment of this solvent extract, the further purification thereof, for example, by repeated extraction and re-extraction into water and/or organic solvents, chromatographic adsorption and other processes, ultimately obtaining an aqueous solution of for example sodium penicillin which was freeze dried to give amorphous sodium penicillin. The freeze dried products suffer from the disadvantages of being hygroscopic and relatively unstable.

Crystalline sodium penicillin and potassium penicillin, however, on the other hand are both relatively stable and non-hygroscopic. Numerous methods for the production of crystalline penicillin salts consequently have been developed in recent years. One of the first methods for the production of crystalline sodium penicillin is disclosed in British Patent No. 600,719, and comprises dissolving amorphous sodium penicillin in a lower aliphatic alcohol and effecting the crystallisation of sodium penicillin therefrom for example by the addition of a non-solvent for sodium penicillin which is miscible with the alcohol.

A subsequent process comprised crystallising a partially purified preparation of relatively high penicillin activity in the presence of a water soluble neutral salt, separating the crystals and re-crystallising them from an organic solvent. Another process comprised adding a salting out agent to an aqueous solution of penicillin or penicillin salts, extracting the penicillin salts from the resulting solution with an organic solvent immiscible therewith and crystallising a pure penicillin salt from the resulting extract.

The prior processes for the production of crystalline sodium penicillin and potassium penicillin suffer from the disadvantages that the overall yield of crystalline material ultimately obtained is not very high and moreover this crystalline material is seldom both substantially colourless and pure. It is an object of this invention to provide a process whereby pure white crystalline sodium penicillin or potassium penicillin may be obtained in good yields.

We have found that the efficient crystallisation of sodium penicillin or potassium penicillin, with the production of substantially pure white crystals of sodium penicillin or potassium penicillin can only be obtained by the combination of certain steps, the importance of which both separately and in combination with each other has not hitherto been realised, and the inclusion of each of said steps in the process being of paramount importance if a good yield of pure white crystalline sodium penicillin or potassium penicillin is to be obtained. Firstly it is necessary that the organic solvent employed should be aqueous normal butanol, and further that the sodium penicillin or potassium penicillin treated according to the process be of a purity of at least 800 units per milligram and preferably of at least 1000 units per milligram. It has been found that where organic solvents other than normal butanol are employed substantially reduced yields of crystalline sodium penicillin or potassium penicillin are obtained, and also that where the purity of the sodium penicillin or potassium penicillin starting material is less than that specified the efficiency of the crystallisation process is impaired and the product of reduced purity. Secondly, the normal butanol solution of the sodium penicillin or potassium penicillin should be treated with a small amount of activated carbon. Although this carbon treatment does not result in any substantial upgrading or purification of the sodium penicillin or potassium penicillin, it effects the removal of small amounts of certain impurities which act as crystallisation inhibitors and the presence of which would prevent the satisfactory crystallisation of the sodium penicillin or potassium penicillin. Thirdly the solution must be substantially neutral, since penicillin decomposition may occur at acid or alkaline pH values in the presence of normal butanol. Finally the penicillin concentration in the normal butanol solution must be at least 15 milligrams per millilitre and preferably, in the case of sodium penicillin 25 to 60 milligrams per millilitre, and in the case of potassium penicillin 20 to 35 milligrams per millilitre, before crystallisation of the sodium penicillin or potassium penicillin is permitted to take place. Wet normal butanol is a solvent for sodium penicillin and potassium penicillin whereas anhydrous normal butanol is substantially a nonsolvent for sodium and potassium penicillin. It is thus clear that by distilling a wet normal butanol solution of sodium penicillin or potassium penicillin, the water will be removed therefrom as an azeotrope with part of the normal butanol, thus causing the sodium penicillin or potassium penicillin to crystallise or precipitate out from the resulting dry normal butanol solution. We have found however that unless the penicillin concentration in the normal butanol solution being thus dehydrated comprises at least 15 milligrams per millilitre before crystallisation commences, satisfactory crystallisation is not obtained. In order to minimise destruction of penicillin during the evaporation stage of the process, it is necessary to carry out this evaporation in a film evaporator, and we have found that by the addition of water to the normal butanol solution of sodium penicillin or potassium penicillin before each pass through the evaporator, such that the water content of the solution does not fall below 5% by volume thereof, until the solution has been concentrated to the specified point, and crystallisation thereafter effected, substantially improved yields and a better product are obtained.

Accordingly the present invention is for a process for preparing crystalline sodium penicillin or potassium penicillin which comprises the steps of treating an aqueous normal butanol solution of sodium penicillin or potassium penicillin, the penicillin being of a purity of at least 800 units per milligram and preferably 1000 units per milligram or more, with activated carbon, in an amount not exceeding 10% by weight of the solution, separating off the carbon, adjusting the pH of the residual solution to a value in the range 5.0–7.5 and preferably 6.4–6.6, evaporating the resulting normal butanol solution by more than one pass through a film evaporator, the water content of the solution being maintained at a value of at least 5% by volume until the penicillin concentration of the solution is at least 15 milligrams per millilitre and preferably 25 to 60 milligrams per millilitre, and then continuing the evaporation of the solution without further addition of water until crystallisation takes place, separating the crystalline product thus obtained and recrystallising it.

The pH values referred to in the specification were determined by diluting a sample of the solution with ten times its volume of distilled water and then measuring the pH of the resulting solution.

Adjustment of the pH of the solution can be effected by the addition of any acid when it is desired to reduce the pH value or by the addition of either an alkaline sodium compound such as sodium hydroxide, carbonate or bicarbonate in the case of sodium penicillin or an alkaline potassium compound such as potassium hydroxide, carbonate or bicarbonate, where it is desired to increase the pH value of the solution.

The carbon treatment of said butanol solution of sodium penicillin or potassium penicillin can be carried out, for example, by stirring the solution with 4% by weight of Actibon C (phosphoric acid activated carbon), or other activated carbon, filtering off the carbon and washing the carbon filter cake with normal butanol, the first washings of the filter cake being added to the filtrate, the second and subsequent washings being used for the first and later washings of a subsequent batch of carbon filter cake.

It is to be noted that all distillation and evaporation operations employed in accord with the process of the present invention involving penicillin containing solutions are carried out at reduced pressure in accord with usual practice in the art in order to avoid decomposition of the penicillin material during such operations. The use of reduced pressures of less than 50 millimeters mercury pressure has been found to be satisfactory.

The film evaporator which is used for the evaporation of the carbon treated aqueous normal butanol solution is preferably a climbing film evaporator of standard construction, and should be capable of a sufficiently high throughput to minimise, if not eliminate, the destruction of the penicillin due to long periods of contact with normal butanol at elevated temperature. The evaporation of the solution is continued until a concentration of at least 15 milligrams per millilitre (i. e. 25,000 units per millilitre) is reached, and during the concentration to this point, a controlled amount of water, where necessary, is added to the aqueous butanol solution before each pass through the evaporator in amount such that the water content of the solution will not fall below 5% by volume during passage through the film evaporator to ensure that premature crystallisation of sodium penicillin or potassium penicillin from the solution will not occur and to reduce decomposition of the sodium penicillin or potassium penicillin which is much slower in the presence of water. Suitably the water concentration should be approximately 20% by volume before each pass. When the concentration of the solution has reached at least 15 milligrams per millilitre of sodium penicillin or potassium penicillin during the concentration stages, crystallisation is effected suitably by one or more additional passes of the solution through the film evaporator without any water addition. These final passes of the concentrated aqueous normal butanol solution through the film evaporator are arranged by adjustment of the concentration of the solution, temperature and flow rate so that the crystallisation of the sodium penicillin or potassium penicillin takes place in the collecting pot and not in the evaporator tube. In order to increase the yield of crystalline product, the mother liquors which separate may be repassed through the evaporator.

It will be understood that the afore described evaporation by a plurality of passes through a film evaporator may be termed "film evaporation in stages," each film evaporation stage corresponding to one pass through the film evaporator.

It should be noted that the concentrated aqueous normal butanol solution of sodium penicillin or potassium penicillin obtained after several passes through the film evaporator may be further evaporated by simple distillation or evaporation under reduced pressure, instead of by further passes through the film evaporator, to effect the crystallisation of the sodium penicillin or potassium penicillin.

The crystalline material and the mother liquors may be separated by filtration and the mother liquors which are usually low in penicillin G content and relatively high in penicillin F content may be treated for the recovery of these penicillins. The separated crystalline product is then recrystallised, suitably by dissolving in aqueous normal butanol, and then adding dry normal butanol to the solution, suitably in two or more stages at about 0° C. to bring the alcohol concentration up to approximately 95–99% by volume, whereupon crystallisation of the sodium penicillin or potassium penicillin occurs. It has been found that if the dry normal butanol addition is carried out up to a final normal butanol concentration of 97% by volume, taking steps to ensure that crystallisation begins at as high a water content as possible and that the crystals separate as needles, substantially white 100% pure crystals of sodium penicillin or potassium penicillin may be obtained in a yield of 72–77% over this last recrystallisation stage. Such a procedure normally gives needles, but appropriate seeding is occasionally necessary. Where the addition of dry normal butanol is continued up to a final concentration of 99% by volume, the yield of crystalline material obtained may be increased, but the colour of the product is also increased. Since the separated mother liquors from this stage can very suitably be returned to the first stage of the process—for example by adding to the carbon treated aqueous normal butanol solution—there is no advantage in continuing the dry normal butanol addition further than 97% concentration.

It should be noted that although the normal butanol solution of sodium penicillin or potassium penicillin which is used for the first stage of the process may be obtained in any suitable way, it is a preferred feature of the invention that this solution is obtained by the extraction of an organic solvent solution of sodium penicillin or potassium penicillin—as obtained in the normal recovery process for the production of penicillin—with water followed by the extraction of this aqueous extract with normal butanol. These extractions can suitably be effected by continuous countercurrent extraction in a tower or multistage unit, the ratio of solvent to water in each extraction being so chosen to achieve optimum extraction of the penicillin while avoiding unnecessary dilution of the penicillin solution thus treated.

It has been found that the treatment of the normal butanol solution of sodium penicillin or potassium penicillin with activated carbon, particularly when a chemically activated carbon is used, results in the acidification of this solution and it is consequently necessary to adjust the pH of this solution to a value in the range 5.0–7.5 and preferably 6.4–6.6 before proceeding with the concentration thereof. This is most suitably effected by the addition thereto of an aqueous solution of sodium hydroxide or potassium hydroxide before commencing the evaporation stage of the process. However, in such cases where the normal butanol solution is already saturated with water it is impossible to neutralise the solution by the immediate addition of aqueous sodium hydroxide or potassium hydroxide thereto and it is thus necessary to add the sodium hydroxide or potassium hydroxide after the solution has been partially concentrated and dehydrated by a single pass through the film evaporator.

The following examples are given to illustrate the process of present invention, the quoted penicillin potencies being in International units, and the percentages being by weight unless otherwise indicated.

*Example 1*

A normal butanol solution of sodium penicillin is agitated with 4% by volume of Actibon C (phosphoric acid activated carbon), the carbon filtered off and the activated carbon filter cake washed with 25% of the volume of the original solution of normal butanol. The sodium penicillin recovered in the filtrate and the first washings is 94.7% of the original sodium penicillin and the colour removal effected by this step is 82%. The carbon treated solution is then evaporated by several passes through a climbing film evaporator having a 61 centimeters long by 6 millimeters internal diameter Monel metal evaporator tube and a condensing system comprising a water jacketed ½-inch internal diameter Monel metal tube.

After the first pass through the evaporator the solution is neutralised to pH 6.5 by means of sodium hydroxide solution. The water content of the feed is adjusted to approximately 20% by volume before each pass. The throughput of liquid through the film evaporator used is approximately 1½ gallons per hour. When the solution has been concentrated to a value of 54.3 milligrams per millilitre of sodium penicillin, the sodium penicillin is crystallised by a further three passes of the solution through the evaporator, the crystalline material being separated in the collecting pot after each pass of the liquid through the evaporator. The crystalline material is then filtered off from the mother liquors, and comprises sodium penicillin of 97% purity in a yield of 80%. The mother liquors contain 12.3 milligrams per millilitre of sodium penicillin and thus the overall recovery of sodium penicillin from the carbon treated normal butanol solution is 99%.

The separated crystalline material is dissolved in twice its weight of approximately 88% by volume aqueous normal butanol and the sodium penicillin recrystallized therefrom by adding dry normal butanol in stages at 0° C. up to a final concentration of 97% by volume. The crystalline material obtained comprises white 100% pure sodium penicillin in a 77% yield, and including the sodium penicillin in mother liquors, which are recycled to the first stage of process by adding to the carbon treated normal butanol solution of sodium penicillin, a material balance of 99% is obtained over this recrystallization stage.

*Example 2*

A normal butanol solution of potassium penicillin is agitated with 4% weight by volume of Actibon C (an acid activated carbon), the carbon filtered off and the activated carbon filter cake washed with 25% of the volume of the original solution of normal butanol. The potassium penicillin recovered in the filtrate and the first washings is 97% of the original potassium penicillin and the colour removal effected by this step is 80%. The carbon treated solution is then evaporated by several passes through a climbing film evaporator having a 61 centimeters long by 6 millimeters internal diameter Monel metal evaporator tube and a condensing system comprising a water jacketed ½-inch internal diameter Monel metal tube.

After the first pass through the evaporator the solution is neutralised to pH 6.2 by means of potassium hydroxide solution. The water content of the feed is adjusted to approximately 20% by volume before each pass. The throughput of liquid through the film evaporator used is approximately 1½ gallons per hour. When the solution has been concentrated to a value of 31.1 milligrams per millilitre of potassium penicillin, the potassium penicillin is crystallised by a further three passes of the solution through the evaporator, the crystalline material being separated in the collecting pot after each pass of the liquid through the evaporator. The crystalline material is then filtered off from the mother liquors, and comprises a 79% yield of potassium penicillin crystals of 99% purity.

The separated crystalline material is dissolved in twice its weight of approximately 88% by volume aqueous normal butanol and the potassium penicillin recrystallised therefrom by adding dry normal butanol in stages at 0° C. up to a final concentration of 97% by volume. The crystalline material obtained comprises white 100% pure potassium penicillin in a 77% yield, and including the potassium penicillin mother liquors, which are recycled to the first stage of process by adding to the carbon treated normal butanol solution of potassium penicillin, a material balance of 99% is obtained over this recrystallisation stage.

The present application is in part a continuation of copending application Ser. No. 100,966, filed July 23, 1949, and of copending application Ser. No. 117,278, filed September 22, 1949 (both now abandoned).

We claim:

1. In a process for the production of a member selected from the group consisting of crystalline sodium penicillin and potassium penicillin by the crystallisation thereof from an n-butanol solution thereof, the improvements consisting of establishing the solution as an aqueous n-butanol solution by dissolving the corresponding penicillin salt selected from the group consisting of sodium penicillin and potassium penicillin, having a purity of at least 800 units per milligram in the aqueous n-butanol, subjecting the said solution to the action of activated carbon in amount not exceeding 10% by weight of the solution, separating off the carbon, adjusting the pH of the solution to a value in the range 5.0–7.5, concentrating the resulting n-butanol solution by film evaporation in stages, the water content of the solution being maintained at a value of at least 5% by volume until the penicillin concentration of the solution is at least 15 milligrams per millilitre and then effecting crystallisation by continuing the evaporation of the solution with further addition of water until crystallisation takes place, separating the crystalline product thus obtained and recrystallising it.

2. The improvements as claimed in claim 1, wherein the penicillin salt starting material is of a purity of at least 1000 units per milligram.

3. The improvements as claimed in claim 1, wherein the pH of said equeous n-butanol solution is adjusted to a value of 6.4–6.6.

4. The improvements as claimed in claim 1, wherein water is added to said n-butanol solution during the concentration thereof in amount such that the water content of said solution is 20% by volume before each evaporation stage.

5. The improvements as claimed in claim 1, wherein the continued evaporation effecting the crystallisation takes place in a subsequent film evaporation stage.

6. In a process for the production of a member selected from the group consisting of crystalline sodium penicillin and potassium penicillin by the crystallisation thereof from an n-butanol solution thereof, the improvements consisting of establishing the solution as an aqueous n-butanol solution by dissolving the corresponding penicillin salt selected from the group consisting of sodium penicillin and potassium penicillin, having a purity of at least 800 units per milligram in the aqueous n-butanol, subjecting the said solution to the action of activated carbon in an amount not exceeding 10% by weight of the solution, separating of the carbon, adjusting the pH of the solution to a value in the range 5.0–7.5, concentrating the resulting n-butanol solution by film evaporation in stages, the water content of the solution being maintained at a value of at least 5% by volume until the penicillin concentration of the solution is at least 15 milligrams per millilitre and then effecting crystallisation by continuing the evaporation of the solution without further addition of water until crystallisation takes place, separating the crystalline product thus obtained and dissolving it in aqueous n-butanol and adding to this solution dry n-butanol in amount such that the n-butanol concentration of the solution is in the range 95–99% by volume and allowing the penicillin salt to crystallise therefrom, and recovering the crystalline penicillin salt.

7. The improvements as claimed in claim 6, wherein the dry n-butanol is added to said aqueous n-butanol solution of the crystalline penicillin salt in at least two stages at 0° C.

8. The improvements as claimed in claim 6, wherein the dry n-butanol is added to said aqueous n-butanol solution of the penicillin salt in amount such that the n-butanol concentration of the solution is 97% by volume.

9. The improvements as claimed in claim 6, wherein the n-butanol mother liquors obtained from the recrystallisation of the penicillin salt are recycled to the process.

10. In a process for the production of a member selected from the group consisting of crystalline sodium penicillin and potassium penicillin by crystallisation thereof from an organic solvent solution thereof, the improvements consisting of establishing the solution by dissolving the corresponding penicillin salt selected from the group consisting of sodium penicillin and potassium penicillin of a purity of at least 800 units per milligram in the organic solvent, evaporating the said solution by film evaporation in stages, the water content of the solution being maintained at a value of at least 5% by volume until the penicillin concentration of the solution is at least 15 milligrams per millilitre, and then continuing the evaporation of the solution until crystallisation takes place, separating the crystalline product thus obtained and recrystallising it.

11. In a process for the production of crystalline sodium penicillin by the crystallisation thereof from an n-butanol solution of sodium penicillin, the improvements consisting of establishing the solution as an aqueous n-butanol solution by dissolving sodium penicillin having a purity of at least 800 units per milligram in the aqueous n-butanol, subjecting the said solution to the action of activated carbon in an amount not exceeding 10% by weight of the solution, separating off the carbon, adjusting the pH of the solution to a value in the range 5.0–7.5, concentrating the resulting n-butanol solution by film evaporation in stages, the water content of the solution being maintained at a value of at least 5% by volume until the penicillin concentration of the solution is at a value in the range 25 to 60 milligrams per millilitre and then effecting crystallisation by continuing the evaporation of the solution with further addition of water until crystallisation takes place, separating the crystalline product thus obtained and recrystallising it.

12. In a process for the production of crystalline potassium penicillin by the crystallisation thereof from an n-butanol solution of potassium penicillin, the improvements consisting of establishing the solution as an aqueous n-butanol solution by dissolving potassium penicillin having a purity of at least 800 units per milligram in the aqueous n-butanol, subjecting the said solution to the action of activated carbon in an amount not exceeding 10% by weight of the solution, separating off the carbon, adjusting the pH of the solution to a value in the range 5.0–7.5, concentrating the resulting n-butanol solution by film evaporation in stages, the water content of the solution being maintained at a value of at least 5% by volume until the penicillin concentration of the solution is at a value in the range 20–35 milligrams per millilitre and the effecting crystallisation by continuing the evaporation of the solution without further addition of water until crystallisation takes place, separating the crystalline product thus obtained and recrystallising it.

HAROLD TOZER.
NEVILLE MACKINNON CROSS.
RONALD GOODEY.

References Cited in the file of this patent

UNITED STATES PATENTS

| Number | Name | Date |
|---|---|---|
| 2,461,949 | Wintersteiner et al. | Feb. 15, 1949 |
| 2,480,991 | Wintersteiner et al. | Sept. 6, 1949 |
| 2,486,181 | Larson | Oct. 25, 1949 |
| 2,520,098 | Hodge | Aug. 22, 1950 |
| 2,599,401 | Leighty | June 3, 1952 |

FOREIGN PATENTS

| Number | Country | Date |
|---|---|---|
| 649,743 | Great Britain | Jan. 31, 1951 |
| 667,275 | Great Britain | Feb. 27, 1952 |